Figure 5:
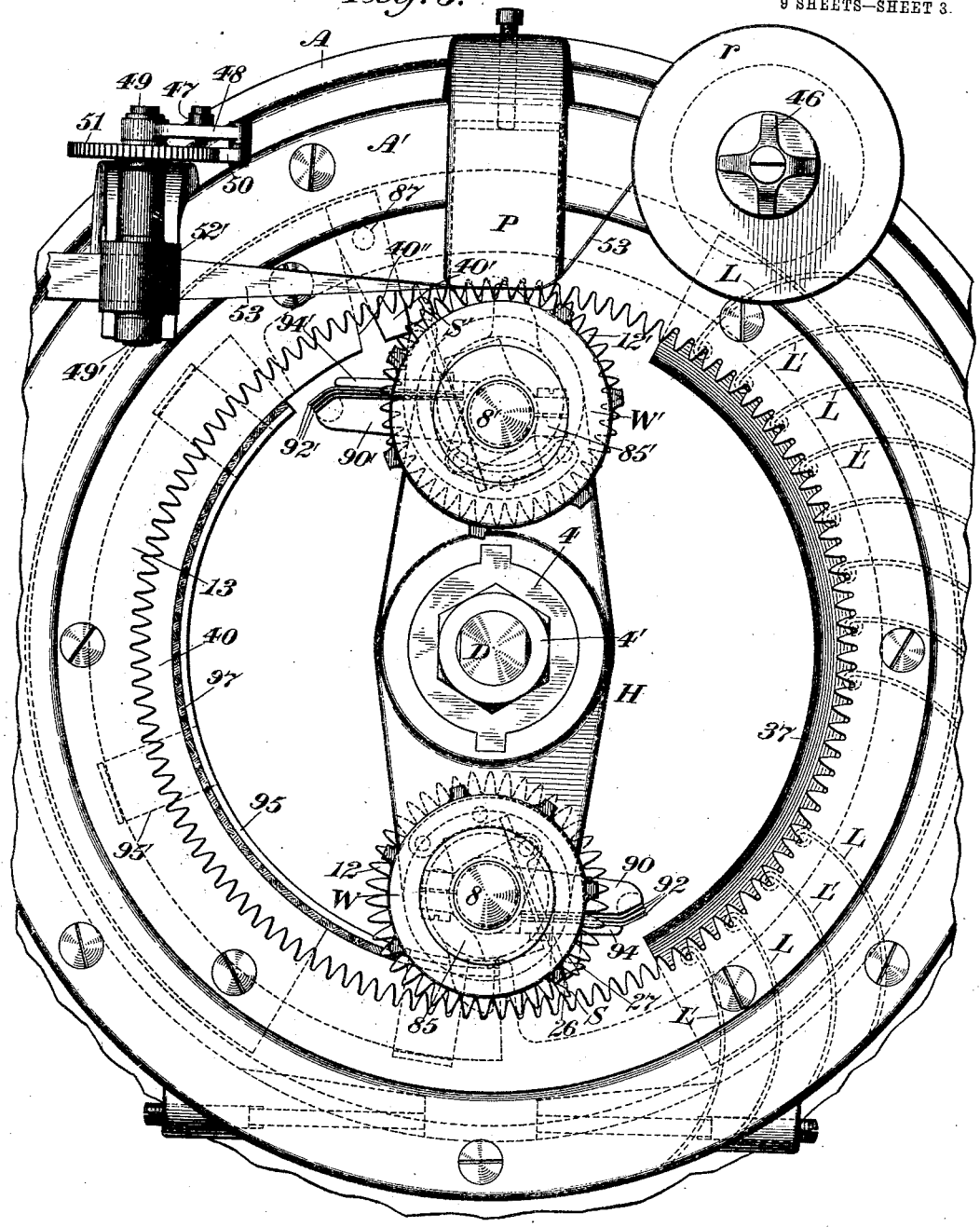

No. 823,080. PATENTED JUNE 12, 1906.
F. H. RICHARDS.
KEY OPERATED MECHANISM.
APPLICATION FILED APR. 7, 1899. RENEWED JULY 6, 1903.
9 SHEETS—SHEET 1.
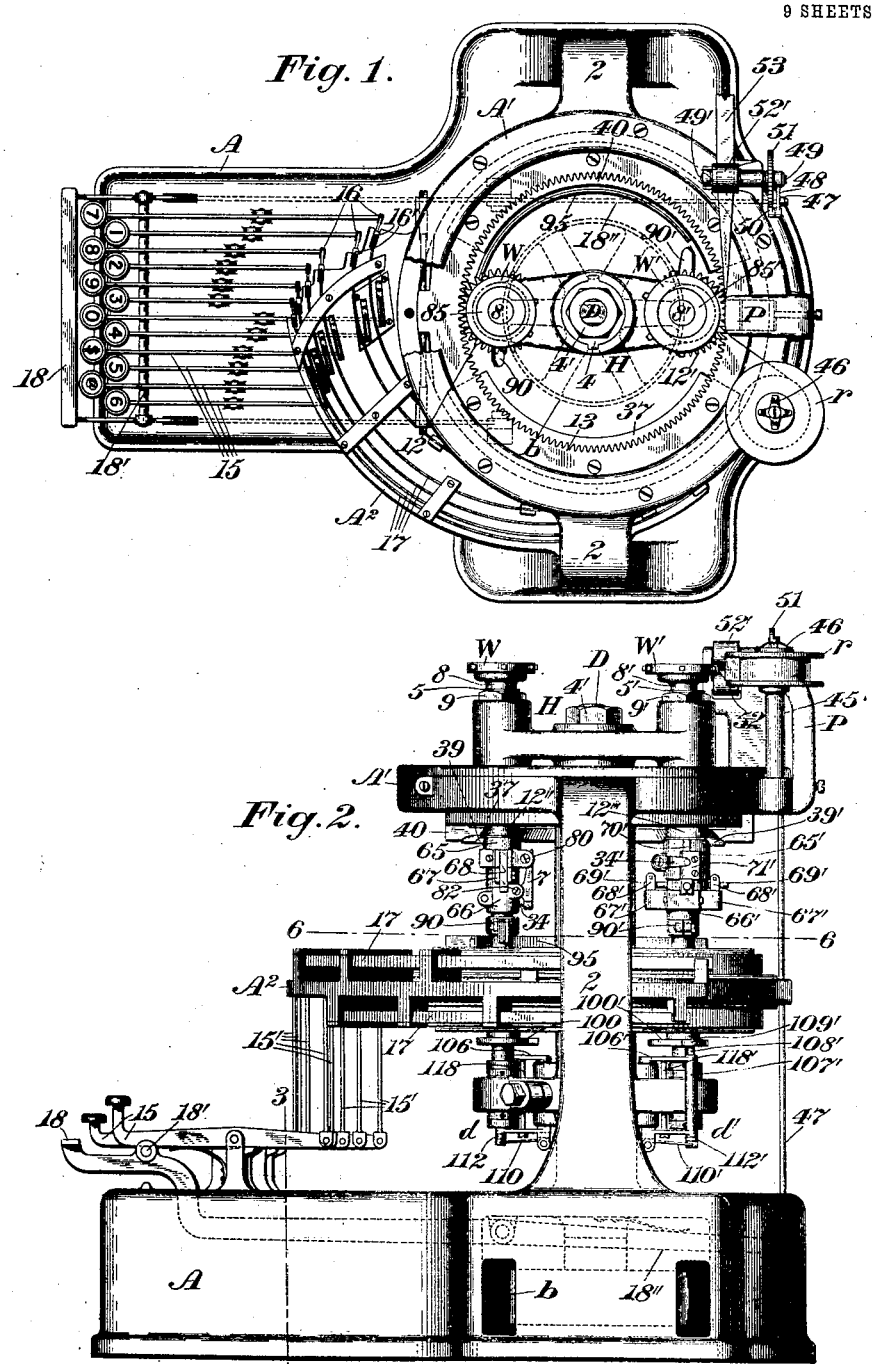
Witnesses:
Inventor:
F. H. Richards.

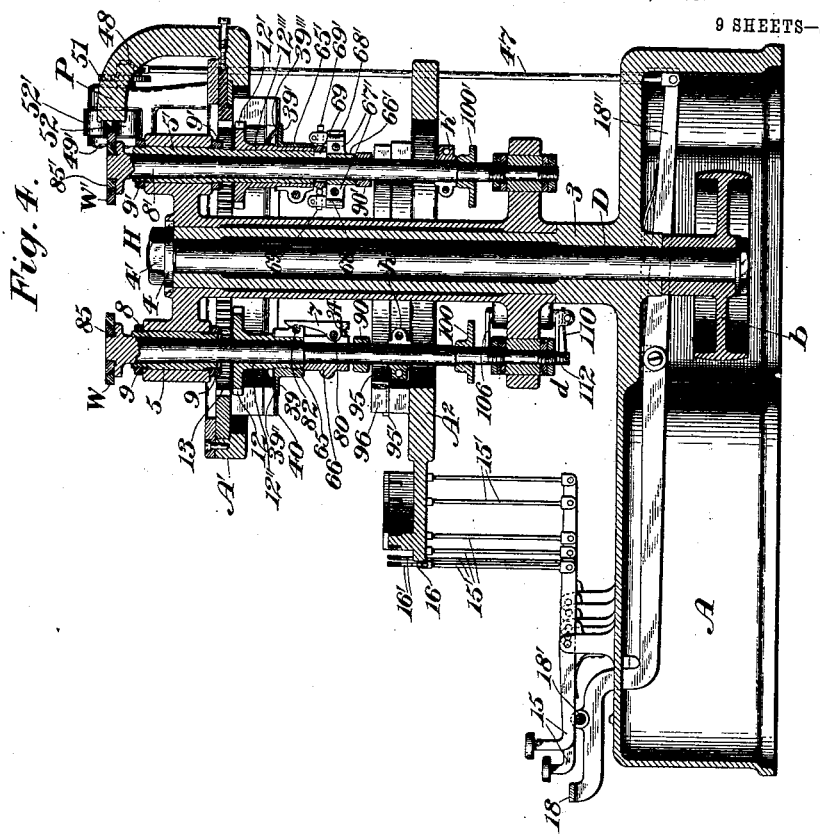

No. 823,080. PATENTED JUNE 12, 1906.
F. H. RICHARDS.
KEY OPERATED MECHANISM.
APPLICATION FILED APR. 7, 1899. RENEWED JULY 6, 1903.

Witnesses:

Inventor:

No. 823,080. PATENTED JUNE 12, 1906.
F. H. RICHARDS.
KEY OPERATED MECHANISM.
APPLICATION FILED APR. 7, 1899. RENEWED JULY 6, 1903.
9 SHEETS—SHEET 5.
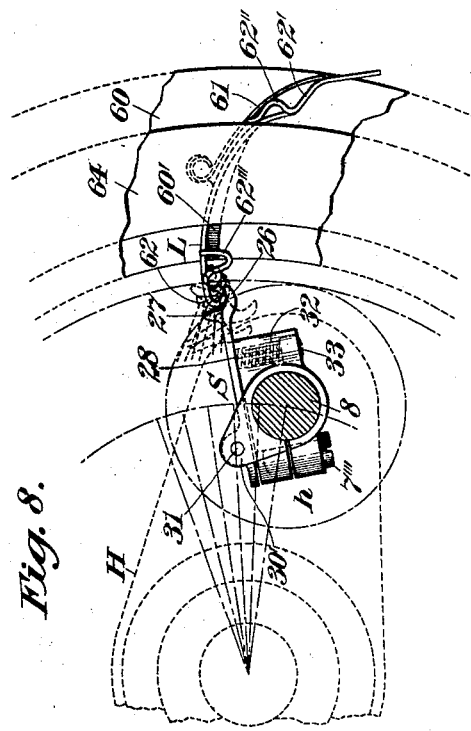
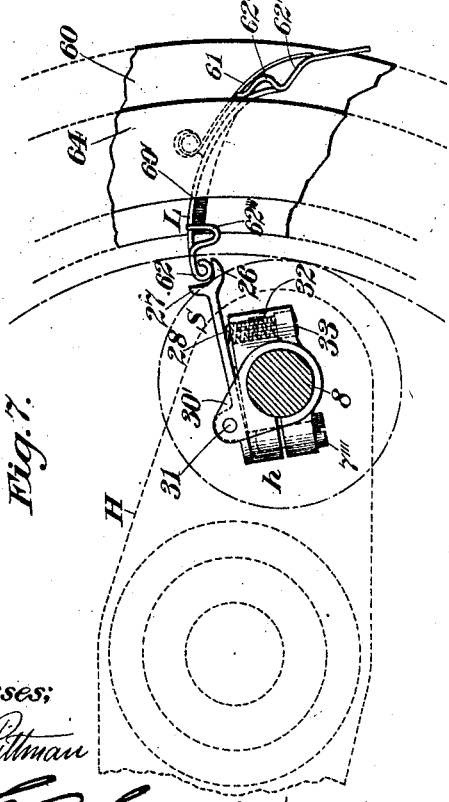
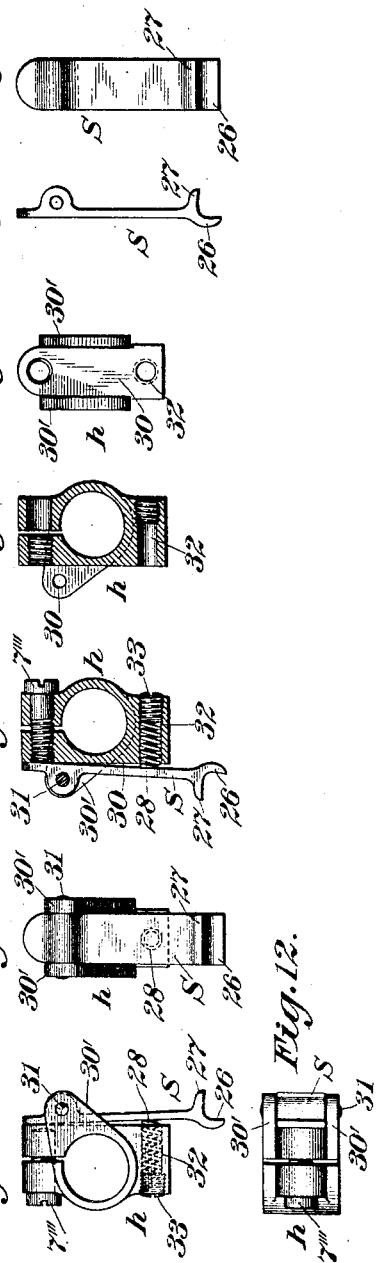
Witnesses:
Inventor:

No. 823,080.
PATENTED JUNE 12, 1906.
F. H. RICHARDS.
KEY OPERATED MECHANISM.
APPLICATION FILED APR. 7, 1899. RENEWED JULY 6, 1903.
9 SHEETS—SHEET 6.
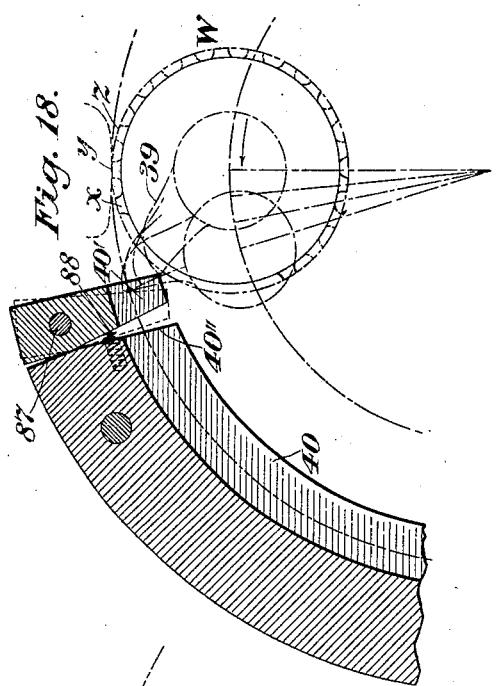
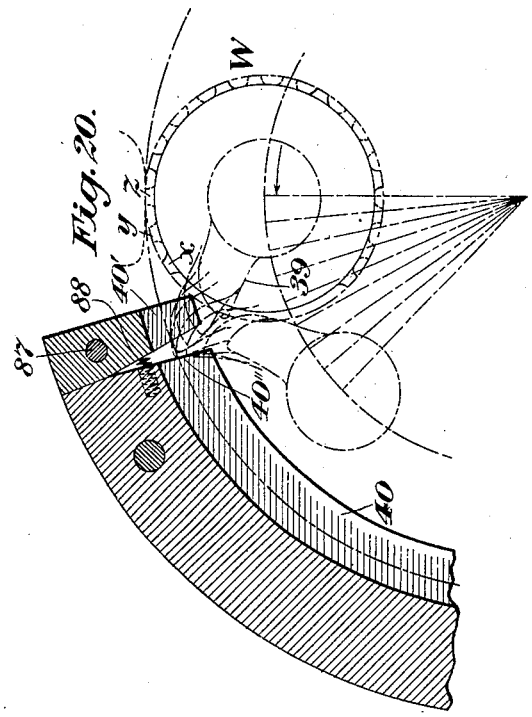
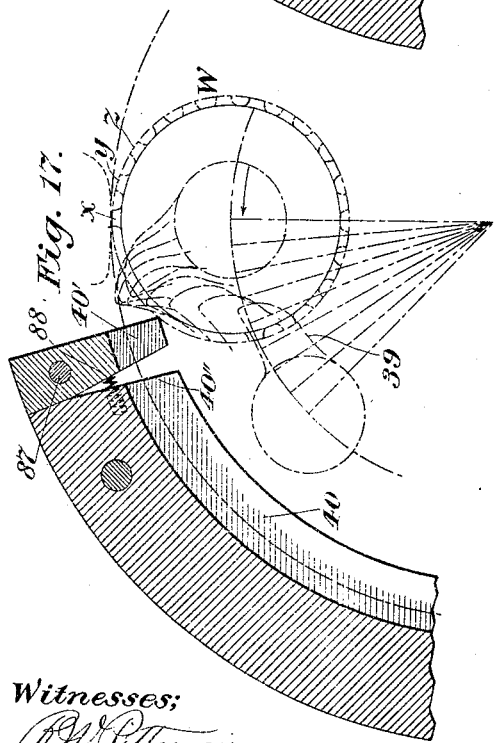
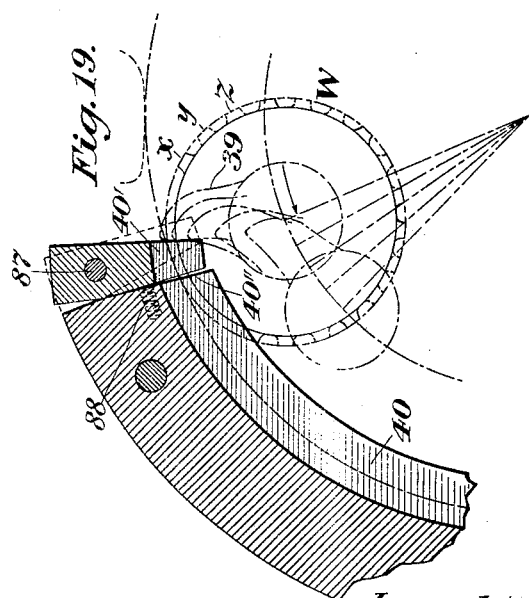
Witnesses:
Inventor:
F. H. Richards

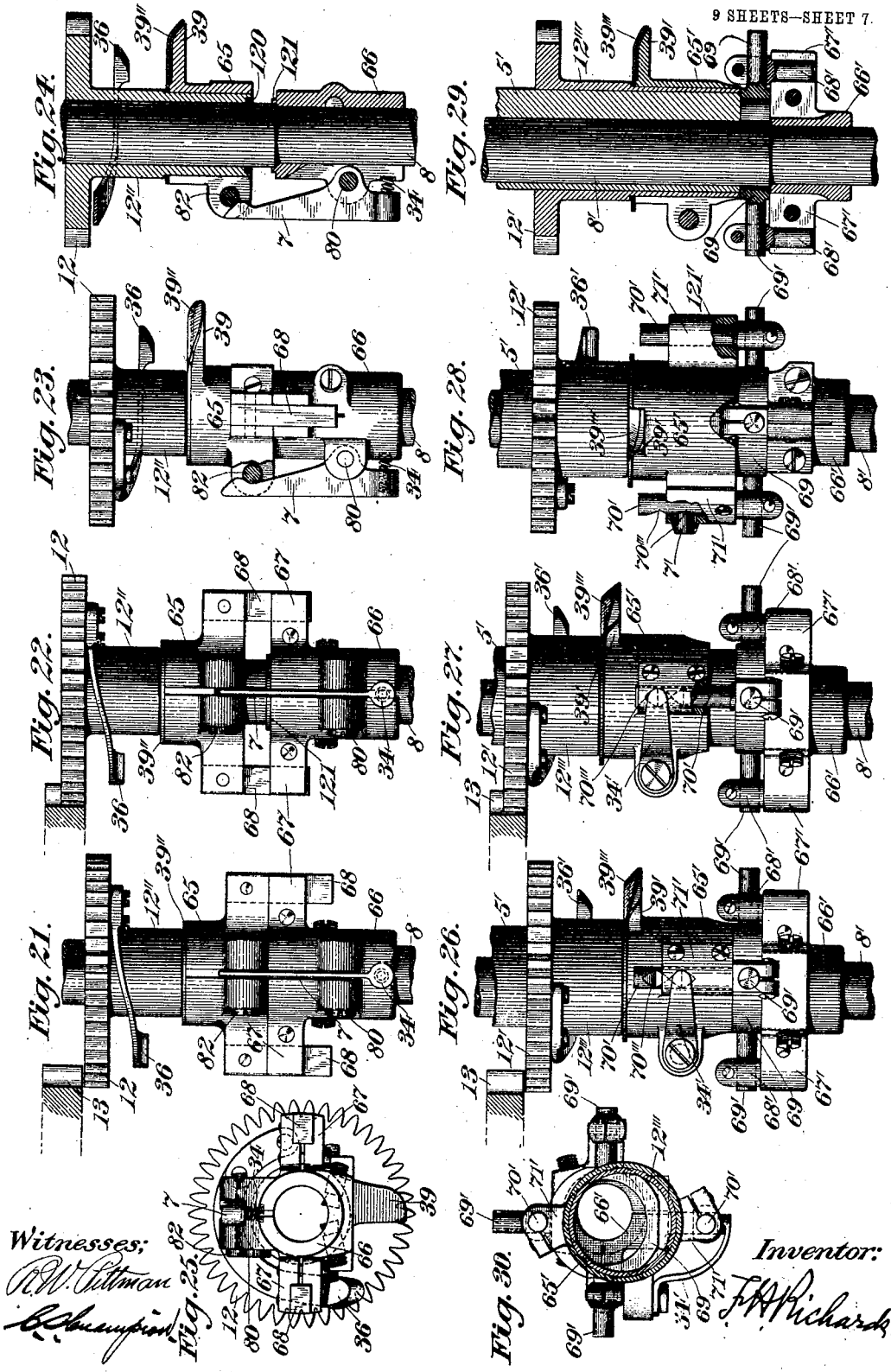

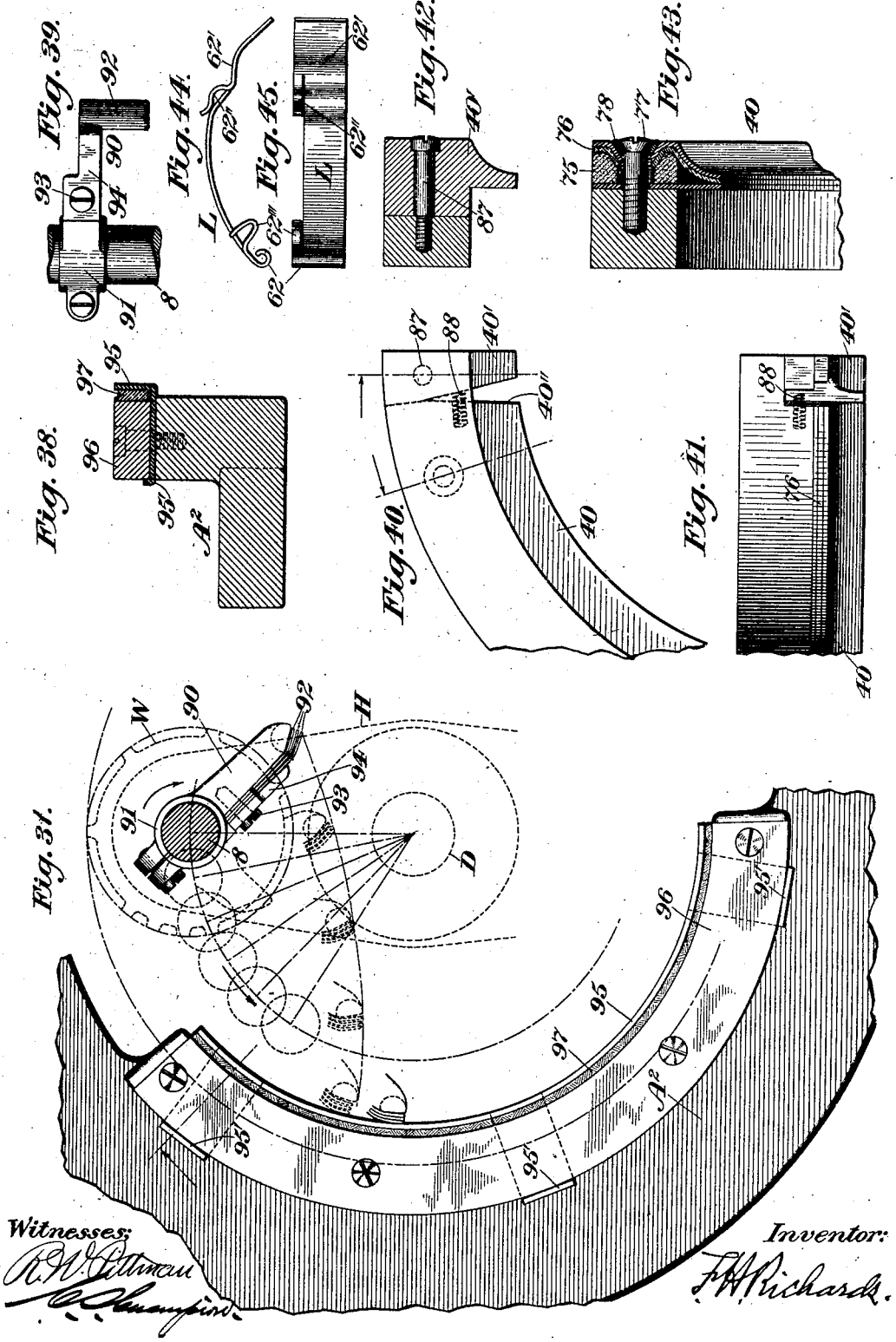

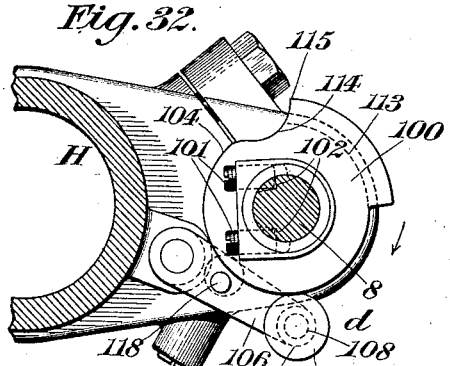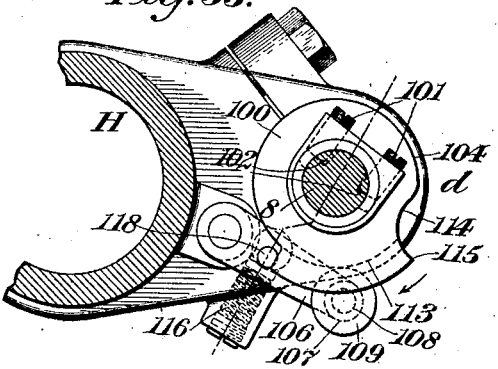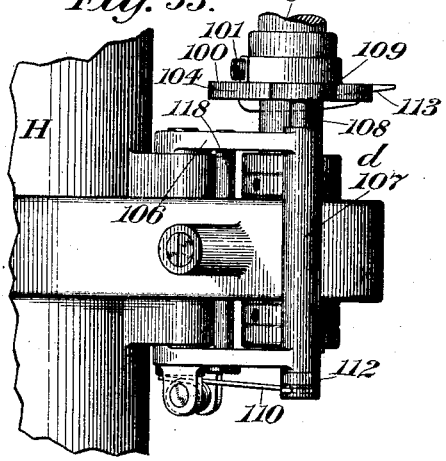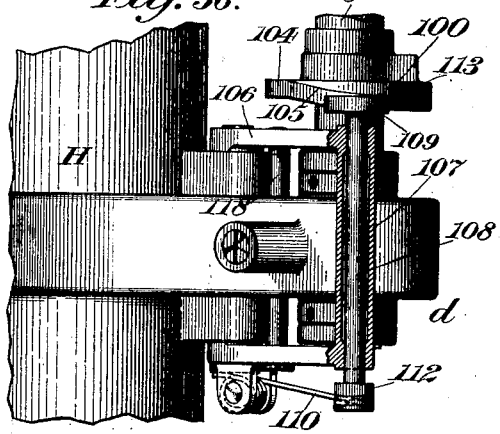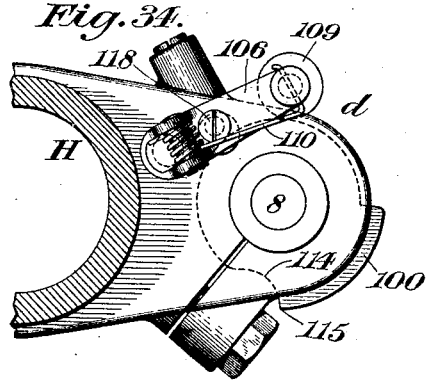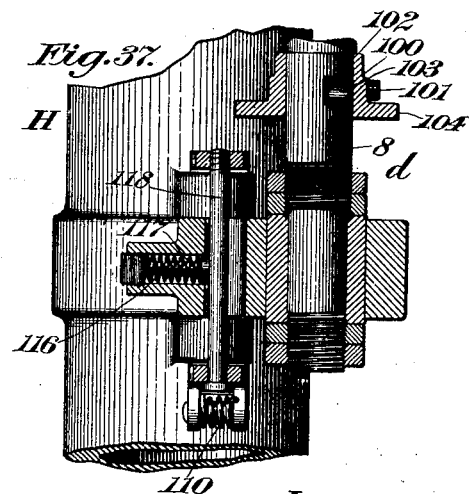

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

KEY-OPERATED MECHANISM.

No. 823,080.      Specification of Letters Patent.      Patented June 12, 1906.

Application filed April 7, 1899. Renewed July 6, 1903. Serial No. 164,479.

*To all whom it may concern:*

Be it known that I, FRANCIS H. RICHARDS, a citizen of the United States, residing at Hartford, in the county of Hartford and State of Connecticut, have invented certain new and useful Improvements in Key-Operated Mechanisms, of which the following is a specification.

This invention relates to improvements in key-operated mechanisms, and especially to a type-writing or analogous mechanism, and is particularly adapted for use in connnection with a certain class of key-operated mechanisms—such, for instance, as that described in my prior patents, Nos. 401,307 and 573,620, granted April 16, 1889, and December 22, 1896, respectively.

One of the main objects of this invention is to provide an improved organization in which the several coöperative submechanisms and devices will coact with one another in such a manner as to produce a minimum amount of noise and wear as the several parts perform their proper functions.

One of the main disadvantages resulting from the use of the devices heretofore employed in this class of key-operated mechanisms is that most of the parts are practically rigid, and as the several operations are dependent upon the rotation of a turret or similar member at quite a high rate of speed a great deal of noise has resulted from the striking of the parts upon one another while moving rapidly, and this has also caused unnecessary wear upon many of the principal parts of the mechanism. In the present construction, however, all of these parts which are intended to come into contact with and strike against other parts while moving at a considerable rate of speed are so organized with respect to their coöperating elements that the blow will be reduced very materially, this result being usually attained by mounting either the moving or the fixed part in such a manner that it will yield readily. In some cases it will be found preferable to mount the movable part in such a manner that it will yield when it strikes the resistant member and will oppose its resistance thereto gradually and with cumulative effect. All of these coacting devices may be embodied advantageously in a mechanism substantially of the type illustrated in my prior patent, No. 573,620, hereinbefore referred to, in which by means of suitable devices a rotary driven gear is carried into and out of engagement with a driving-gear the orbit of which corresponds with that of the driven gear, the coupling and uncoupling of the latter being effected at the proper points in its orbital movement.

A mechanism of this type embraces within its orgaization a large number of coöperative parts, many of them absolutely necessary to a complete and operative machine or mechanism, and the operations of those parts which are directly dependent upon their travel in an orbit are also interdependent ordinarily and certainly in this machine, as the proper operation of the mechanism will only result when a predetermined sequence of movements is observed, and the starting of the rotation of one orbitally-movable member in this class of mechanism should always set in motion in proper order many other parts. Among the many coacting devices included within the organization of such a machine there may be many different sets of members, each of which sets may embody a movable member and a resistant member, and it is my aim with respect to each one of these sets to reduce the noise and also the wear incident to the coming of the movable member into contact with the resistant member of such set. In the present mechanism there are at least four such sets of parts, all coöperative with one another and so organized that the operation of the movable member of one set determines the setting in motion of the movable members of all the other sets. One of these sets controls the starting of an orbitally-movable rotary driven gear rotating. A second set is operative for coupling such driven gear to the driving-gear. A third set serves to uncouple the driven gear from the driving-gear, and a fourth set operates to stop the rotation of the driven gear, all of these sets not only coöperating with one another, but all being brought into action in a predetermined order and in their proper timing, and each set having, as before stated, one of its members so mounted as to present a yielding or resilient face to the complementary member of the set, and thereby oppose a gradually-increasing or cumulative resistance thereto to decrease the noise and shock as the parts come into contact with each other, and thus at the same time reduce the wear upon such parts.

One of the most important features of this invention is the means which I employ for starting the rotation of an orbitally-movable rotary driven member or gear, and this starting means embodies several elements having individual features of novelty in addition to those which result from the combination of the elements. One of the main features of this starting means is a novel type of resistant starter or latch supported and held in such a manner as to be readily settable from one position to another and maintained in such position until it is required to shift it again, one of the main characteristics of this latch or resistant starter being that unlike other latches heretofore used it is not latched in place by a locking-latch, which has to be released by another part before the latch can be moved, but, on the contrary, is only held by reason of a yielding sliding engagement with some coacting part. Hence a latch of this type is always in position to be shifted in one direction or the other without being previously released from a locked engagement with some other member. When this latch is set, therefore, by suitable latch-setting means, only a single movement of the latch-setting member is required and only a single part—viz., the latch itself—needs to be actuated by such latch-setting member.

Ordinarily the settable starter and the means by which it is side-guided will be in yielding engagement with each other in order that the starter may be held at any point to which it may be moved, but may not be free to slip or be shaken accidentally to a different position. The detent just referred to may be and in this case is a yielding member, such as a side-guiding member, for engaging such starter and preventing improper movement of the latter. In the construction shown herein this detent or side-guiding device is a spring separate from the starter and suitably mounted adjacent thereto. The starting member or latch itself may also be so constructed as to coöperate to the best advantage with such resilient detent and with suitable stop-walls for limiting the longitudinal movements of the latch. For this reason and in order to decrease the noise which would result from the striking of a rigid latch against a fixed stop I prefer to employ a latch having one or more yielding or spring stops which may be struck up from the body of the latch when the latter is formed from sheet metal, as it will be ordinarily, and when so made the latch will also have a beaded working end forming a rounded journal-surface adapted to coöperate with a movable member or starting-arm and rotate the latter.

In each set of movable and resistant members hereinbefore referred to one of the parts is intended to yield relatively to the other to decrease the noise due to the shock of contact, and in this instance one of the starters will be yieldingly secured to its support, the movable starter being preferably so mounted. As to this feature my present invention is in the nature of a modification of a movement-starting mechanism shown, described, and claimed in a companion application filed by me April 25, 1899, Serial No. 714,358. In such other application the noise due to this shock is decreased by employing a movable starter or starting-arm made up of a plurality of resilient arms adapted to oppose their several resistances to the resistant starter or latch successively and with cumulative effect; but in such other application this gradual increase in the resistance opposed to the resistance starter is secured by subdividing the movable starter into a plurality of successively-effective members, all forming part of one main starter fixed to a suitable support, whereas in this case the starter, usually the movable one, is yieldingly secured to its support and may itself be a rigid member. The preferred construction is a movable starter pivoted to its support and having a suitable spring interposed between it and the support.

Other features of my invention not hereinbefore referred to relate to the uncoupling means for carrying the driven gear out of mesh with the fixed driving-gear, to a detent device for holding the driven gear or rotary driven member after its rotation is stopped, and to certain other improvements, all of which will be hereinafter described in detail.

Figure 6:
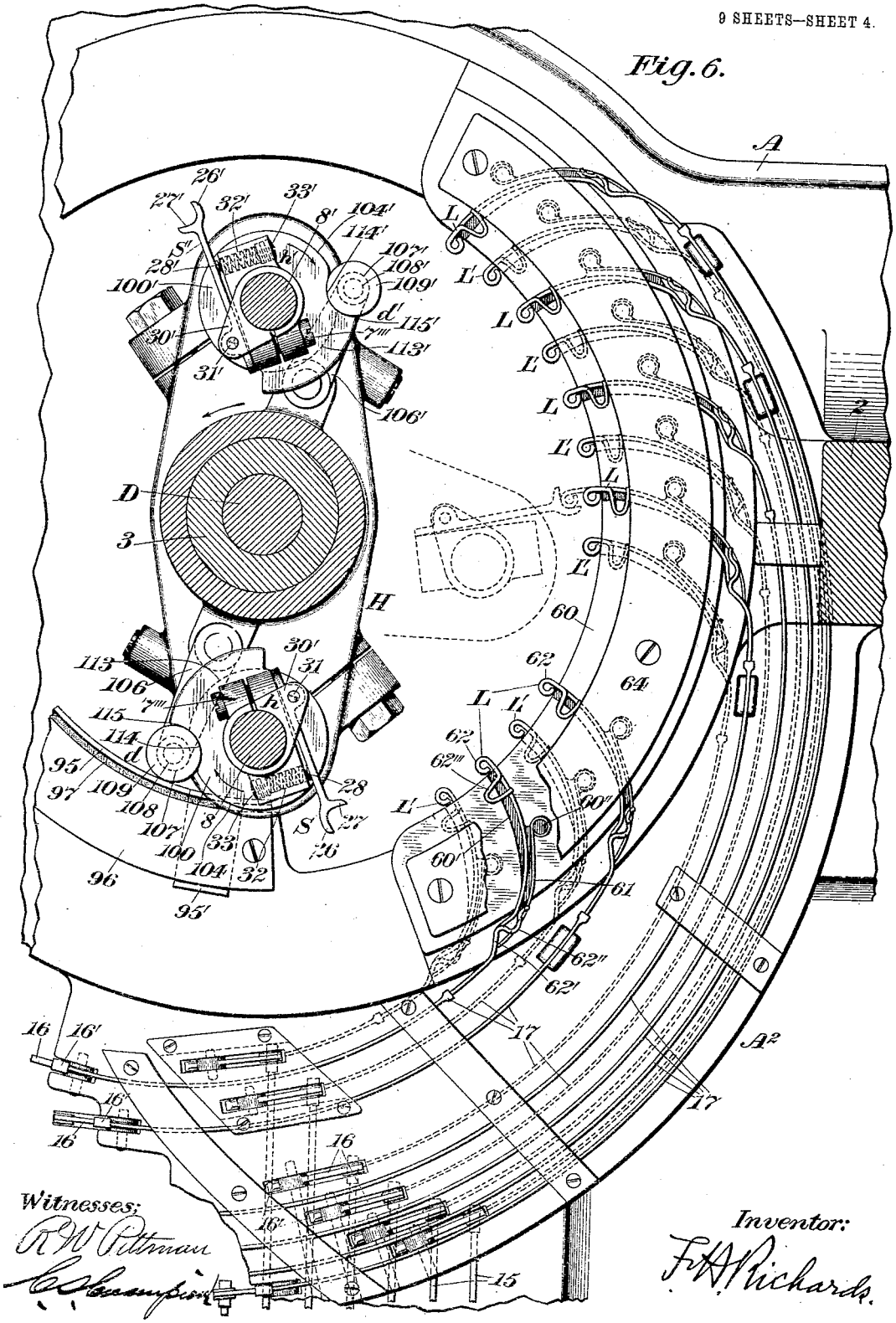

In the drawings accompanying and forming part of this specification, Figure 1 is a plan of a simple form of type-writing machine embodying my present improvements. Fig. 2 is a side elevation of the same. Fig. 3 is a vertical sectional front elevation of the same, the section being taken in the line 3 3, Fig. 2. Fig. 4 is a central vertical longitudinal section of the same. Fig. 5 is an enlarged plan of a portion of the machine, illustrating the turret, the type-wheels thereof, the driving-gear, and certain other devices. Fig. 6 is an enlarged sectional plan of a portion of the same, illustrating the resistant starters or latches and the movable starting-arms coöperative therewith, the section being taken in line 6 6, Fig. 2. Figs. 7 and 8 are enlarged details illustrating the manner in which the latch and a starting-arm coöperate with each other. Figs. 9 to 12, inclusive, are enlarged details illustrating a starting-arm and a support or clip by which it is carried. Figs. 13 and 14 are details of the clip for supporting such starting-arm. Figs. 15 and 16 are details of the starting-arm. Figs. 17 to 20, inclusive, illustrate the manner in which the uncoupling means operates to shift the rotary driven member out of action when its rotation is started at different points in its orbit of movement. Figs. 21 to 25, inclusive, are enlarged details illustrating the coupling and uncoupling arms and the detent device for a rotary driven gear mounted concentrically with the axis of rotation of its support. Figs. 26 to 30, inclusive, are enlarged details illustrating the coupling and uncoupling arms and the detent device for a rotary driven gear mounted eccentrically to the axis of rotation of its support. Fig. 31 is an enlarged detail view illustrating the means for stopping the rotation of one of the rotary driven members. Figs. 32 to 37, inclusive, are enlarged details illustrating in different positions the detent device which I prefer to employ for holding the rotary driven member or gear after it has stopped rotating. Figs. 38 and 39 are details illustrating, respectively, the fixed and movable stops for stopping the rotation of the driven member. Figs. 40 to 42, inclusive, are details of the fixed element of the uncoupling means and the shiftable member of such fixed element. Fig. 43 is an enlarged detail illustrating the construction of the fixed element or cam of said uncoupling means, and Figs. 44 and 45 are details of one of the resistant starters or latches.

Similar characters designate like parts in all the figures of the drawings.

In the preferred construction my improvement will be embodied usually in a mechanism similar in type to that illustrated in my prior patent, No. 573,620, in which I have shown a starting mechanism controlling the operation of a driven gear shiftable from one to the other of two positions into and out of mesh with a driving-gear the orbit of which corresponds with that of the driven gear and in which also suitable gear-shifting means controlled by the starting mechanism is employed for coupling said driven gear to and uncoupling it from the driving-gear to permit the driven gear to continue rotating after it has been started and to assure the throwing out of action of the driven gear at the end of a predetermined period of operation.

Any suitable framework may be employed for supporting the several operative parts of the mechanism, the framework illustrated in this case embodying a base A, connected by suitable supports 2 to a top plate A', between which and the base A is an intermediate annular support $A^2$.

Rising from the base A is a hollow column or base 3, which may support for rotation the main shaft D of the mechanism, this shaft being intended to carry a rotary turret or frame, such as H, which in turn may support for rotation relative thereto a pair of driven members or spindles 8 and 8', properly mounted for rotation in bearings in the upper and lower ends of the turret H. The turret H is supported in the usual manner for rotation on the hollow column or post 3 and is connected at its upper end to the main shaft D in any suitable manner, as by means of a washer 4, keyed thereto (see Figs. 1 and 4) and secured to the shaft D by a nut 4'. Both the spindle 8 and the spindle 8' will ordinarily be set in tapered bushings at their upper ends, said bushings being indicated by 5 and 5' and being properly held in place and adjusted by means of nuts threaded on the ends thereof, said bushings being adjusted up or down, as may be desired, by properly turning these nuts 9 and 9'. At the lower ends thereof the spindles 8 and 8' are also mounted in bushings and are adjusted and held in their adjusted positions by suitable adjusting-nuts and check-nuts, which will be apparent by reference to Figs. 4 and 37. The spindle 8 may support for rotation therewith substantially in the usual manner a driven gear, such as 12, which is adapted to be rotated, when in gear therewith, by means of a driving-gear, such as the internal circular gear, (shown at 13.) Normally the driven gear is preferably out of mesh with the driving-gear and is shiftable longitudinally of its axis and transversely of the plane of the driving-gear into mesh therewith. Said driven gear is concentric with the axis of the spindle 8 and is intended to carry in unison therewith several of the parts controlling the operation of different elements of the mechanism, as will hereinafter more fully appear.

It is intended that the operation of the mechanism shall be controlled from a suitable keyboard, a simple one being shown herein for this purpose. This keyboard may be made up of a plurality of key-levers, such as 15, pivoted on the base A and held in their normal positions by suitable springs, said key-levers being connected in this instance by connecting-rods 15' to the arms 16 of rock-arms suitably supported on the annular member $A^2$ of the framework, the arms 16' of said lievers serving to operate corresponding latch-actuators 17, which may be curved strips slidable in proper guideways on the frame member $A^2$ and preferably concentric with one another, these actuators or strips 17 being shifted in one direction by the arms 16' on the depression of the respective keys and returned to their normal positions by the latches or resistant starters when the latter are reset by a starting-arm.

In connection with the several key-levers 15 I also deem it desirable to employ a space-key or space-bar, which may be of the type illustrated herein at 18, it consisting in this case of a U-shaped frame properly pivoted on the framework and having at one side thereof a rearwardly-extending arm 18'', and it also having a universal bar 18' in position to be depressed by the key-levers 15 every time that one of the latter is operated. Hence the space-key will in this case be operated whenever any of the keys of the keyboard is manipulated, and thus may serve as the means for controlling the operation of a feed device for governing the feed movement of a suitable strip or other traveling member on which impressions are to be recorded. In the construction herein illustrated the feed mechanism is of a very simple type and is intended to feed a strip or tape of paper or other suitable material from a roll or reel, preferably properly tensioned. Here this roll, which is indicated by r, is supported on a vertical stud 45, a simple tension device 46 being provided for maintaining the tape taut as it is fed forward. The feed mechanism embodies in this case a connecting-rod 47, pivoted to the rear end of the arm 18" and operated by the latter and at its upper end pivoted to a link 48, loosely mounted on the stud 49, supported on the top plate A', and carrying also a feed-pawl 50, coacting with a ratchet-wheel 51, journaled on said stud 49. To this ratchet-wheel is also secured a feed-roll 52, which coacts with a complementary roll 52', mounted on another stud 49' just above the lower roll and its stud, and between these rolls the tape is fed intermittently by the action of the pawl-and-ratchet device as the several keys are operated. Of course each time that a key-lever or the space-bar is operated the tape will be fed one space on the return of such key-lever or space-bar to its normal position; but the devices carried by the turret mechanism will only be operated when the key-levers are depressed and will not be actuated by the space-bar 18. As the tape or strip 53 is fed from the roll r it may pass around the face of a platen, such as P, before it reaches the feed-rolls 52 and 52', and this platen should be in position to permit an orbitally-movable rotary impression member to make a record upon that portion of the tape resting against the platen. This platen will advantageously be adjustable, as clearly illustrated in detail in Fig. 5, in order that it may be kept in position to coact properly with each impression member.

The resistant starters or latches, which are intended to control the starting of the rotation of certain rotary parts carried by the turret H, may be supported in a suitable manner by the frame member A² and may be disposed in two sets one located above the other. The resistant starters or latches L of the upper set are intended to coöperate with a movable starter or starting-arm, such as S, carried by the spindle 8, while the latches L' of the lower set are intended to coact in a similar manner with a movable starting-arm S', carried by the spindle 8'. Of course the vertical positions of the starting-arms S and S' will correspond to those of their coacting latches. The latches which I have illustrated herein are, as before stated, of novel construction, and a description of the construction and manner of supporting one will suffice for all.

Referring particularly to Figs. 6, 7, 8, 44, and 45, it will be seen that in this construction the latches L are mounted in slideways 60' in an arc-shaped or segmental support 60, each of these slideways being somewhat curved longitudinally in order that it may conform to the shape of the resistant starter or latch which I prefer to use. This latch is intended to lie in its slideway and to be reciprocated back and forth, while held in such a manner as to prevent its jarring or shaking loose during the operation of the mechanism, and in order to prevent such loosening of the latch the latter and the means by which it is side-guided will preferably be in yielding engagement with each other. Any suitable means may be employed for assuring such a yielding engagement as that just mentioned; but I prefer to employ in connection with the latch a detent with which the latch may be yieldingly engaged at all times and which may also serve as the side-guiding means therefor. Here this detent is in the form of a spring, such as 61, suitably supported at one end, as by being coiled within a circular opening 60" of the segment 60 and lying against one wall of the slideway 60', the detent part of the spring being so located and constructed as to tend to press the latch against the opposite or fixed wall of the slideway and also at certain times to slip into a shallow recess in the face of the latch and engage a suitable detent-face of the latter.

In the preferred construction the latch itself will usually be a sheet-metal one having a beaded working end 62, formed in the usual manner by turning over the end of the sheet-metal latch to form a rounded journal-surface with which the movable starting-arm may coöperate. Each latch will usually be bowed or bent, preferably in a simple curve, except at the point where it is necessary to provide a shallow recess into which the detent may slip to lock and hold the latch temporarily in its normal retracted position, and this shallow recess may be formed by bending the latch, as shown clearly in these views, one wall of the recess constituting a detent-face 62', against which the free end of the spring 61 will rest when the latch is held by it. In this position not only does the end of the spring 61 constitute a positive stop, but the spring itself presses the latch firmly against the fixed wall of the slideway 60' and holds the latch securely in place. This hold upon the latch, however, is not in the nature of a locking hold, and the detent 61 does not have to be released by first shifting it away from the latch before the latter can be moved, as is ordinarily the case. On the contrary, this holding-detent is one that is releasable by simply setting the latch by a longitudinal movement of the latter, and in the construction illustrated herein the latch-actuating strip 17 is effective to push the latch inward and set the same in its working position when the proper key is depressed, the movement of the latch itself serving to force the holding end of the detent 61 up the cam-shaped detent-face 62' of the latch without first shifting the detent out of way by an independent action. In other words, this detent 61 is not a locking-detent, as all the other detents heretofore used for this purpose have been, so far as I am aware, but is a slip-detent, releasable by the mere action of shifting the latch inward. Not only does this construction permit the setting of the latch without first releasing a detent by a separate or independent movement; but as the spring 61 is always in contact with the latch there is practically no noise, and, moreover, these results are attained by an organization of devices having the smallest possible number of parts. As it is desirable, also, to prevent undue noise, which ordinarily results from the striking of a rigid latch against rigid stop-faces when moved back and forth, cushion devices or buffers may be used to advantage in connection with the latch herein shown. In this case one or more spring-stops may be employed, preferably formed integral with the latch itself, one spring-stop serving to limit the movement of the latch in one direction and the other in the other direction. Here the spring-stop, which limits the forward movement of the latch when the latter is projecting into the path of a movable starting-arm, is indicated by 62'' and projects from the convex face of the latch in order to brace the latter properly. For the same reason the other stop, which may be a U-shaped stop, such as 62''', and which will of course limit the return movement of the latch, should project from the concave face of said latch. These two spring-stops will of course coöperate with suitable fixed stops, which may be formed by side edges of suitable segments, one of which is indicated in Fig. 6 by 64. All of these latches hereinbefore referred to coöperate with one or the other of the two movable starters or starting-arms S and S', and in order to reduce the noise due to the striking of such starting-arm against the latch when the former is revolving rapidly one of such starters should be so mounted on its support as to yield in the direction of revolution of the movable starter, and thus cause the resistance of one part to the other to be presented gradually and with cumulative effect in such a manner that when the parts come together there will be but little shock and slight noise, and yet the full resistance of one member will be opposed to the other before the parts separate.

In my companion application, Serial No. 714,358, filed April 25, 1899, I have also illustrated a construction suitable for attaining this end, and in that case the movable starter or starting-arm is so constructed as not only to be turned by the latch with which it comes into contact, but is also formed in such a manner as to oppose a gradually-increasing resistance to the resistant starter, and hence prevent the sudden starting of the movable starter. In that case, however, the latch is fixed to its support, whereas in this case the desired result is attained by mounting the starting-arm on its support in such a manner that the former will be capable of moving bodily relatively to the latter, the preferred construction being one in which the starting-arm is pivoted to its support and has a spring interposed between the two members, this spring being so constructed or proportioned as to permit the movable starting-arm to yield when it strikes the set latch and cause the resistance of the latch to be opposed gradually and with cumulative effect to the starting-arm, which will of course yield less and less as it is being brought under tension or compression.

Usually of course the starting-arm will embody a member or face capable of resetting the resistant starter or latch by which it is turned, and in the preferred construction the rotary starting-arm will be a combined starter and resetter capable of opposing a gradually-increasing resistance of the starting-arm to the latch at the moment that such arm begins rotating, this construction also resulting in a gradual disengagement or separation of the coacting faces of the two starters on the resetting of the resistant starter or latch. Here the starting portion or face of the starting-arm S' is designated by 26 and the resetting portion or face by 27, the toggling action exerted by the latter for forcing the latch back to its normal position and resetting it before being disengaged therefrom being substantially similar to that described in my last-mentioned patent, No. 573,620, granted December 22, 1896.

Any suitable holding means may be employed for mounting the movable starters or starting-arms just described; but in this case I have illustrated at $h$, Figs. 6 to 14, inclusive, a holder or clip adapted to be secured to a rotary carrier or spindle that is journaled in the frame or turret H. In the construction illustrated this holder is a divided clip which is held in place on the spindle by a set-screw, such as 7''', and the starting-arm is pivoted on a pin 31, passed through ears, such as 30', which define the sides of a channel 30 of a width sufficient to accommodate the starting-arm. One end of the back wall of this channel forms a stop for limiting the movement of the starting-arm in one direction, and the other end forms a similar stop for limiting the movement of said starting-arm in the opposite direction, and it will be noted that the range of this movement is but slight.

Any suitable yielding medium may be interposed between the starting-arm and its support for the purpose of taking up the shock due to the striking of the movable starting-arm against the fixed starter; but I prefer to employ a helical spring, such as 28, which works in a bore 32 in the clip $h$, this bore being threaded at one end to receive an adjusting stop-screw 33 for the purpose of regulating the force to be opposed by the spring when the starters come into contact. It will be noted that this spring is almost entirely concealed and is very sensitive and positive in its action.

An important feature of my present improvements is the provision of means for employing impression members or wheels of different diameters. Ordinarily these impression-wheels may be of the same diameter and may be located at equal distances from the axis of the turret; but it is sometimes necessary to make them of different diameters, and when this is the case a plurality of internal gears of different diameters would usually be required to operate them. By means of the devices shown in the drawings of the present application I am enabled to drive impression members of different diameters from a single internal gear or rack, and this is the principal function of the eccentric driving mechanism for operating the large impression-wheel. The impression member or wheel, which is of smaller diameter or radius, will of course be mounted in such a manner that its axis of rotation will be more remote from the axis of the turret than is the axis of the larger impression member or wheel. In order that this larger impression member or wheel may be driven in proper timing, however, I prefer to connect it with a driven gear mounted eccentrically thereto, this organization of the parts being especially desirable for operating the several driven gears for several impression members or wheels from the same resistant driving gear or rack.

The manner in which I prefer to mount the driven gear for the impression member or wheel of large diameter is shown most clearly in Figs. 4 and 5 and 26 to 30, inclusive. The spindle 8' is intended to carry this impression member of large diameter and usually will also carry with it in its orbital movement a rotatable driven gear suitably mounted thereon. As has been hereinbefore mentioned, this spindle is journaled in a long sleeve or bushing 5', the periphery of which is eccentric to that of the spindle itself, as will be apparent by referring to the drawings, and the periphery of this eccentrically-bored bushing or sleeve is intended to be a journal-surface on which a driven gear may be mounted for rotation. Such a driven gear is illustrated herein at 12', it having a long sleeve 12''' substantially similar in most respects to the long sleeve 12'' of the driven gear 12. The bushing 5' may be turned to adjust the spindle 8' and its impression member by moving said member toward or from the axis of the turret, the nuts 9' serving to lock the bushing in its adjusted position.

It will be apparent, of course, that the gear 12' and the spindle 8' should be suitably connected for rotation in unison in order that the impression member carried by said spindle may be operated. In the construction shown herein I have illustrated a suitable device for this purpose, it being in the nature of a universal connection between a collar on the spindle and another collar carried by the long hub 12'''. In this case the spindle 8' has secured thereto a collar 66', with oppositely-extending arms 67', bifurcated and bored to receive the shanks of a pair of pins 68', which are also bifurcated at their upper ends and properly bored to receive the pins 69' of a coupling-ring 69, located between the coupling-sleeve 65' and the hub 12''' on the sleeve 5' and the sleeve 66' on the spindle.

Suitable adjusting-screws are shown herein for adjusting the positions of the bifurcated portions of the pins and arms just mentioned. Two of the arms 69' are in this case passed through corresponding bores in the bifurcated ends of another pair of pins 70', which in turn are supported for reciprocation in the bored openings of correspondingly-bifurcated lugs 71', integral with the collar 65'. These devices just described constitute a universal connection or star-coupling by means of which the driven gear and the spindle are enabled to rotate in unison about different axes, while at the same time the driven gear may be reciprocated longitudinally of its axis on the sleeve 5', and thus carried into or out of mesh with its coacting driving-gear or fixed circular rack. Both the collar 66' and the collar 65' are split sleeves or collars and will be securely fastened, the one to the spindle and the other to the hub 12''', by means of suitable clamping-screws in the ordinary manner.

It has already been pointed out that in an organization of mechanism of this type it is of the utmost importance to prevent unnecessary shock and pounding of the parts upon one another as the radially-moving elements of the turret come into contact with the other members with which they coöperate, as unless this pounding is materially reduced the noise due thereto will be almost intolerable. The manner in which the shock due to the striking of the starting-arm against the latch is reduced to a minimum has been hereinbefore described, and the manner in which the shocks due to the coupling and uncoupling operations are reduced will now be set forth.

In the construction illustrated the orbitally-movable elements of the coupling and uncoupling means will preferably be carried directly by the driven gears, which mesh with the fixed internal gear or circular rack, and these movable coupling and uncoupling elements will usually be the ones which will yield during the coupling and uncoupling actions. In this case the coupling members carried by the driven gears 12 and 12' are preferably separate parts detachably secured to said gears and may be of the construction illustrated at 36 and 36', Figs. 21 to 30, inclusive. Each of these movable coupling elements is mounted to yield relatively to the driven gear and preferably will be a spring-arm having a cam-shaped working face, the whole constituting a spring-cam which will yield when it first comes into contact with the coöperative resistant coupling member or cam-face and will enable the driven gear to move gradually into true mesh with the fixed internal gear, and if the driven gear does not move properly into mesh at first it will yield sufficiently to prevent breaking of such movable coupling element. Obviously as the driven gear is out of mesh with the fixed driving-gear when the movable member or spring-cam comes into engagement with its coacting coupling member such movable coupling member may be so constructed as to be capable of yielding to a very much greater extent than is necessary in the case of the movable uncoupling member, for which it is only necessary to provide a working face sufficiently yielding to reduce the shock incident to the striking of the uncoupling members against each other when the driven gear is shifted out of action.

For the above reason the main portions of the two uncoupling members or cams may be somewhat heavy and in this case will preferably be fixed cams, such as 39 and 39', integral with the respective split collars or sleeves 65 and 65', clamped to the spindles 8 and 8'. In each case, however, I have shown herein a separate yielding working portion for each of the fixed cams 39 and 39', and these yielding members will preferably be resilient sheet-metal faces, such as 39" and 39''', properly supported in their working positions and movable into contact with the cam-faces of the fixed members 39 and 39' and shaped to correspond thereto while separated therefrom by a sufficient space to reduce the noise to a minimum. In this case the resilient sheet-metal cam, the air-space between the sheet-metal plate and the fixed cam-face, and the oil which works into such space will all in practice be factors in cushioning the cam, and thus preventing undue noise. Both the sheet-metal coupling-cams and the coupling members or spring-arms are preferably separate parts in order that they may be readily and economically renewed when damaged or worn.

The resistant coupling and uncoupling members which operate with the parts just described may be substantially similar in construction to the corresponding members illustrated in my prior patent, No. 573,620, hereinbefore mentioned. These resistant coupling members or cam-faces are designated herein in a general way by 37 and 40, respectively, the former being the coupling-cam and the latter the uncoupling-cam. It is desirable that the uncoupling-cam segment at least shall be so constructed as to deaden the blows of the resilient cam-arms 39" and 39''' to a still greater extent, and for this reason the cam-face 40 is preferably a sheet-metal one, (see Fig. 43,) between which and its fixed support may be interposed suitable means for absorbing vibration and deadening the sound due to the blows received thereon. In this case I have illustrated a fiber block 75, between which and the sheet-metal cam 40 may be interposed a strip of leather or similar material, such as 76, which, it should be noted, will at all points separate such sheet-metal cam from its support. These parts may be secured to a support by means of screws, such as 77, and in order to prevent transfer of sound by the latter a leather washer, such as 78, may be interposed between the head of the screw and the plate 40, all of the parts at the point of connection being preferably countersunk, as illustrated.

It will be understood, of course, that the turret mechanism should be continuously rotated in order that the starting-arms and other orbitally-movable elements may be prepared to coöperate with the resistant actuators corresponding thereto whenever one of the key-levers is depressed. Any means may be employed for effecting this movement of the turret, a band-wheel b being shown in this case, which may be rotated continuously from any suitable source of power.

Whenever either of the driven gears 12 and 12' is to be coupled to the driving-gear 13, the starting-arm thereon will of course first come into contact with a set latch and start such driven gear and its spindle rotating, after which the rotation thereof will be continued by reason of the coupling of the driven gear to the driving-gear when the spring-arm 36 or 36' rides up the corresponding fixed cam 37. During this coupling action the driven gear or member will be shifted longitudinally of its axis, and hence has three movements—one an orbital movement, another a movement of rotation, and a third a movement of reciprocation axially of the carrier or spindle on which it is supported. Some means should, of course, be employed for holding each driven gear in mesh with its driving-gear until the gear reaches a predetermined point in its orbit, and hence I have illustrated herein suitable detent devices for this purpose.

The detent which is employed in connection with the driven gear 12 is clearly illustrated in Figs. 21 to 25, inclusive, and will now be described. Here the spindle 8 has secured thereto a split collar 66, substantially similar to that shown at 66', and on this is supported a detent-lever 7, which is pivoted on a smooth portion of the shank of a clamping-screw 80, which helps to hold the collar in position on the shank. A spring 34 may serve to hold the detent in position to latch the driven gear in either of its extreme positions, said lever having at its working end a pair of cam-faces either one of which may engage a pin or other member on the collar 65. Here the lever works in contact with a smooth portion of the periphery of a clamping-screw 82, which holds the split collar in place on the sleeve 12''. The manner in which this detent operates will be apparent by referring to these views. The sleeve 65 is guided in this case in its movements by a pair of depending guides 68, which work in slots in the arms 67 on the collar 66.

The manner in which the sleeves 65 and 66' are connected with each other in order to permit reciprocation of the driven gear 12' has been hereinbefore described, and a similar form of detent device is employed in connection therewith to hold the driven gear and its sleeve in either of their extreme positions. Here the detent employed is indicated by 7' and is carried at one end of a spring-arm 34', secured to the collar 65'. The detent 7' is intended to fit into either one of a pair of notches 70''' in one of the pins 70' in a manner which will be apparent by referring to Figs. 26 to 30, inclusive.

As the latches are disposed at different points in the orbits of movement of the starting-arms, the rotation of each starting-arm, and hence of the parts controlled thereby, will begin at a point corresponding to the positions of the latch, which of course will correspond with that of the character or die which it governs.

The two impression members or die-wheels are indicated herein by W and W' and may be of any suitable construction, but will preferably be annular members at the upper ends of the spindles 8 and 8', respectively, and held in place by clamp-nuts, such as 85 and 85', screwed on to the threaded upper threaded ends of reduced portions of these spindles. (See particularly Fig. 4.) The separate impression members or type-dies on these wheels will be spaced somewhat close together when it is desired to make use of a large number of dies on a single wheel, which is the case in the construction shown in Figs. 17 to 20, inclusive. Three of these impression devices or dies are indicated herein by $x$, $y$ and $z$, and, as will be seen, are close together. Of course each of these dies will be brought into action by starting the rotation of the wheel W at a different point in its orbit from that at which its rotation commences when either of the other two is selected by its appropriate latch, and this being the case it follows, of course, that after the wheel has been properly operated it will be thrown out of action by uncoupling the driven gear at a different point in its orbit from that at which it would be uncoupled for either of the other two dies. The intervals between the points at which such die-wheel and its driven gear are uncoupled and thrown out of action correspond, of course, to the intervals between the dies on such type-wheel, and as this interval is comparatively small the uncoupling arm or cam 39 will of course come into contact with the uncoupling-cam 40 at points correspondingly close together. Moreover, it is desirable to rotate the wheel W a different number of times when certain of the characters are selected from what it is when certain others are to be used, because the starting-latches are disposed in different orbital positions and start said wheel rotating at different points in its orbit and because the length of the throw-out cam is limited, and this being the case it will be seen that if the cam-face 40 were a solid one throughout its entire length and the uncoupling-cam 39 were to rotate in the path illustrated in Fig. 17 the uncoupling action would not take place until the arm 39 reached a point near the end of the cam-face 40, while if it were to rotate in the paths shown in Figs. 18 and 20, corresponding to the movements of the wheel for the characters $y$ and $z$, the arm 39 and the driven gear and the wheel W would be thrown out of action as soon as the arm 39 came into contact with the cam-face 40. If, however, it is desired to permit the arm 39 to make another rotation when the character $y$ is selected, (see Fig. 18,) then it is evident that some means must be provided for preventing the throwing out of action of the driven gear and the wheel W at this point.

For the above reasons I have found it expedient to employ a fixed uncoupling member having a movable element, and this constitutes one of the most important features of my present improvements. In the construction shown one of the members of the uncoupling means, in this case the fixed member 40, has a shiftable section preferably of the type shown clearly in these views. Usually it will be an oscillatory member, such as 40', complementary to the main fixed member 40 of the uncoupling means—that is to say, the cam-face thereof will be shaped to correspond with that of the fixed member 40 and will be in the same plane therewith. In the construction illustrated this oscillatory section is pivoted on the smooth shank of a screw 87, threaded into a suitable supporting member. (See Fig. 42.) The adjacent end of the fixed member 40 is in this case cut away obliquely, as at 40'', in order to permit a slight movement of the shiftable section on its pivot, said oblique face 40'' forming a stop for limiting the movement of the shiftable section in one direction, while the straight end face of the fixed member forms a stop for limiting the movement of the shiftable section in the opposite direction. A light spring, such as 88, may be employed for holding the shiftable section in its normal position away from the fixed member 40, as seen in Fig. 17.

If now the character x has been selected, the wheel W will be rotated in the path shown in Fig. 17, and the arm 39 will not strike either the shiftable section 40' or the main cam 40. If, however, the character y has been selected, then as the rotation of the wheel is started at a different point the arm 39 will not traverse the same path as that shown in Fig. 17, but instead will come into contact with the section 40' and will shift the same, as shown in Figs. 18 and 19, but will not be thrown out of action thereby, as the shiftable section will yield sufficiently to prevent the uncoupling of the driven member or gear and the wheel W by the uncoupling-arm 39. If, however, the character z is selected, the rotation of the wheel will begin at still another point, and in its travel the point of the arm 39 will assume a position about midway between the shiftable section 40' and the fixed section 40, and the cam-face of said arm will strike against the cam-face of said shiftable section and will exert a thrust or pressure thereon in a direction opposite to that in which pressure is exerted by it when it shifts the section 40' to the position shown in Fig. 19. Hence as the pressure or force exerted on this shiftable section is upward and toward the right, as seen in Fig. 20, this section will at such time constitute a fixed member or rigid abutment, and the resistance opposed thereby to the arm 39 will of course be sufficient to shift said arm, its driven gear, and the wheel W away from the fixed member of the uncoupling means, and hence out of action.

For the purpose of preventing overrunning of the driven gear and wheel on either spindle 8 or 8' after the uncoupling of the driven gear from the driving-gear I prefer to employ in connection therewith means for checking or stopping the rotation thereof. In the preferred construction this stopping means will embody two complementary parts, one of which will be a member movable with the driven gear and its wheel, while the other will be a resistant device in position to be struck thereby. These parts, however, like the others hereinbefore described, should be so constructed as to reduce the shock of contact and the noise resulting therefrom to a minimum. Hence I have illustrated herein yielding means for stopping the rotation of the driven gear and its type-wheel, and two of these are employed, one for each driven gear; but as a description of one of the movable stopping members will suffice for both but one of them will be described in detail, appropriate prime-marks being employed to designate corresponding parts of the other movable member. Here this stopping-arm, which is designated by 90, is carried by a split ring or collar 91, clamped to the spindle 8 and adjustable to any desired position thereon. (See Figs. 31 and 39.)

In order to subdivide the resistance opposed by this arm to the fixed member with which it coöperates, I prefer to make use of a plurality of yielding members or spring-arms, such as 92, disposed one in advance of the other in such a manner as to oppose a gradually increasing or cumulative resistance to the fixed member in substantially the manner hereinbefore described with reference to the starting-arms. The spring-arms 92 may be detachably secured to the fixed arm 90 by a set-screw 93 and a keeper-plate 94. The fixed member which coacts with this stop-arm will preferably be a cushioned arc concentric with the axis of the turret H, and in the construction illustrated an arc-shaped plate 95 is employed having integral clips 95', by means of which it may be located in position, it being held in place in this instance by an arc-shaped keeper-plate 96, screwed onto a fixed portion of the framework, a strip of yielding material, such as the leather strip 97, being interposed between the plate 95 and the edge of the keeper-plate 96 in order to reduce the noise. Of course the plate 95, being loosely held in place by the clips 95' in the direction of the thrust of the arm 90, will be free to move slightly as the stop-arm comes into contact therewith.

While it is desirable to make use of the stopping means just described to check and stop the rotation of the driven gears and their type-wheels, said devices are not sufficient for the purpose of bringing these rotary members to a stop in a definite and certain position each time, and while they operate effectively to bring these driven members almost to a standstill I prefer to employ means more positive in their action to stop and hold each of the driven members in the same rotative position each time that one of them is thrown out of action. Two of these holding means or detent devices are employed herein, one for each of the separately-rotative driven members, and as both of them are of the same construction a description of one will suffice for both, the two devices being indicated in a general way by d and d', respectively.

One of the most important features of this part of my present improvements is the employment of a detent device in which the parts are so constructed and organized that the part which serves as the detent proper will have but a slight movement for the purpose of latching or locking the part to be held thereby, and this movement will be in such a direction as to decrease the shock upon the contacting parts and to render the operation of the device almost noiseless. The locking or latching of the driven member is intended to be effected by the detent device by a movement of the latter in a direction longitudinally of the axis of the driven member which it is intended to hold, and in the preferred construction this detent will not only move in the direction just stated, but will also have a movement toward and from the axis of such rotary driven member or impression member, which movement will usually be controlled by a circumferential cam-face having no quick let-off face down which the detent may drop, as such a construction would result in violent shocks upon the moving parts, and hence undue noise. Instead the circumferential cam-face on the driven member will preferably be combined with a lateral cam-face tapering or diverging from the plane of the major portion of the circumferential cam-face, and the two cam-faces will preferably coact in such a manner as to shift the detent in one direction during one portion of the rotation of the driven member and its cam and in another direction transverse thereto during another portion of such rotation. In the construction illustrated herein (see Figs. 32 to 37, inclusive) I have shown a cam 100 of suitable construction, the cam-faces thereof being preferably formed on a sleeve removably secured to the spindle 8 by adjusting clamping-screws 101, the ends of which are intended to abut against coacting stop-faces 102, formed by cut-away portions 103 of the spindle, this construction being the same as that described in my companion application hereinbefore referred to for the purpose of holding and adjusting a starting-arm on its shaft. This cam 100 in the present case has two different cam-faces, one of which is a circumferential cam-face, such as 104, all portions of which are substantially parallel with the axis of the spindle 8, and the other is a lateral cam-face 105, all the portions of which are transverse and approximately perpendicular to such axis.

Any suitable detent may be employed in connection with this controlling-cam; but I prefer to make use of a detent capable of reciprocation in a straight line in an oscillatory frame in order that the former may be shifted toward and from the axis of the spindle by the circumferential cam-face and longitudinally of such axis by the lateral cam-face. This frame may be substantially of the type indicated herein by 106, being pivoted on a suitable portion of the turret and having a sleeve 107, in which a detent-rod 108, having at the end thereof a roller-detent 109, is mounted for reciprocation. This roll 109 will ride on the circumferential cam-face 104 when in its normal position, it being held there, preferably, by a suitable spring, such as 110, which tends to force it into the plane of the major portion of this cam-face, the rod or spindle 108 having a stop 112 at the end opposite the roll 109 in order to locate the latter in such normal position. At a predetermined point in the rotation of the cam 100 the outer side of the roll 109 will come into contact with the initial end of the lateral cam-face 105 and will be shifted or reciprocated sidewise in opposition to the force of the spring 110 until said roll is on the circumferential cam-face 113, as shown clearly in Fig. 36. As the cam continues to turn the roll 109 will continue to ride on the cam-face 113 until it reaches the depression 114 between the cam-faces 113 and 104, when it will ride gently down said cam-face 114 and substantially at the same time will reach the end of the cam-face 105, whereupon the spring 110 will become effective to shift the roll 109 quickly to its normal position in the plane of the cam-face 104, and this movement will bring it directly in front of the stop face or point 115. Hence the roll will not only be in the recess formed by the cam-face 114, and therefore in position to hold the cam and prevent further rotation thereof and all the parts controlled thereby, but it will also be directly in front of this stop-face 115 and being in contact therewith will prevent any movement of the cam and its spindle in the opposite direction. A suitable spring, such as 116, may be carried by the turret and may control a pressure-pin 117, which by contact with a movable part of the oscillatory frame 106 may force the frame toward the axis of the spindle 8, and hence cause the roll 109 to drop into the recess 114 when the roll comes opposite the latter. In this case I have illustrated a screw-bolt 118 on this frame 106, against which bolt the pin 117 may exert its force.

From the foregoing description of this detent it will be evident that the roll 109 has a very slight movement toward and from the axis of the spindle 8 and that owing to the construction of the cam-face 114 no shock or noise will result from its travel thereover. It will also be evident that as it comes in front of the positive stop-face 115 the moment that it is reciprocated to its locking position the cam will be held positively in such a manner as to prevent return movement of the shaft, and this without any shock upon the moving parts such as would result if the roll were to ride over a quick-let-off cam-face or stop-face in the ordinary manner.

As the driven gears 12 and 12' are shifted longitudinally of the spindles 8 and 8' when uncoupled from the driving-gear 13, considerable noise would result from their coming violently into contact with the stops provided therefor unless some means were employed for deadening the blow. In order to do this effectively, I prefer to employ in connection therewith dash-pots, which may be formed by complementary male and female members on those parts which come into contact, the sleeve 12", Fig. 24, having in this case a recess 120, coacting with a complementary projection 121 on the split sleeve 66, the projection and the recess being of the same diameter and so constructed that when they come together the cushion of air compressed therebetween will prevent shock, and hence noise. The corresponding meeting parts of the modified form of device shown in Figs. 28 and 29 may be cushioned in the same manner, as will be evident by referring particularly to Fig. 28, where 121' indicates a projection on the pin 70, this projection coacting with a corresponding recess in the lug 71'. Of course the other pin and lug 70' and 71' have corresponding complementary male and female members, forming a similar dash-pot.

From the foregoing description of my improved key-operated mechanism it will be apparent that all of the several parts which are brought into contact with one another on the manipulation of the keys are effectively cushioned to prevent undue noise and that although many of the parts are constantly coming into contact in this manner all of the parts are so organized that in operation the machine is almost noiseless. Moreover, all of the parts are capable of adjustment with great precision, and those upon which most of the wear comes may be readily renewed at slight cost without substituting large and expensive parts therefor, each of the main contacting members being formed as a separate element secured to, but detachable from, its support to permit such renewal thereof when broken or worn as the result of accident or use.

Having described my invention, I claim—

1. The combination with a detent and a settable starter-actuating latch in yielding sliding engagement with each other, of an orbitally-movable starter normally out of engagement with said latch but coöperative therewith when the latch is set.

2. The combination with a detent, of a settable starter-actuating latch in yielding sliding engagement with the detent and operating to release itself from the latter during the setting of the latch; latch-setting means for shifting the latch in opposition to the frictional hold of the detent; and an orbitally-movable starter normally out of engagement with said latch but coöperative therewith when the latch is set.

3. The combination with a settable starter-actuating latch, of a detent in frictional engagement with one face of the latch; latch-setting means for shifting and setting the latch in opposition to the frictional hold of the detent; and an orbitally-movable starter normally out of engagement with said latch but coöperative therewith when the latch is set.

4. The combination with a settable starter-actuating latch, of a resilient detent in frictional engagement with one face of the latch; latch-setting means for shifting and setting the latch in opposition to the frictional hold of the detent; and an orbitally-settable starter normally out of engagement with said latch but coöperative therewith when the latch is set.

5. The combination with a settable latch having a detent-face, of a resilient detent in frictional engagement with one face of the latch and normally in contact with said detent-face when the latch is in its idle position; latch-setting means for shifting and setting said latch in opposition to the frictional hold of the detent; and a movable starter normally out of engagement with said latch but coöperative therewith when the latch is set.

6. In combination with a resistant starter, a movable starter normally out of engagement with the resistant starter but coöperative therewith when the resistant starter is set, one of said starters having a yielding stop.

7. In combination with a resistant starter, a movable starter normally out of engagement with the resistant starter but coöperative therewith when the resistant starter is set, one of said starters having spring-stops.

8. In combination with a resistant starter, a movable starter normally out of engagement with the resistant starter but coöperative therewith when the resistant starter is set, one of said starters having spring-stops at different points in its length.

9. In combination with a resistant sheet-metal starting member having an integral spring-stop struck up from the body thereof, a movable starter normally out of engagement with the resistant starter but coöperative therewith when the resistant starter is set.

10. In combination with a resistant sheet-metal starting member having a pair of integral spring-stops struck up from and projecting from opposite sides of the body thereof, a movable starter normally out of engagement with the resistant starter but coöperative therewith when the resistant starter is set.

11. A machine of the class specified embodying a resistant sheet-metal starting member having a beaded working end forming a rounded journal-surface, and a movable actuated starter coöperative with said resistant starting member.

12. A machine of the class specified embodying a resistant sheet-metal starting member having a beaded working end forming a rounded journal-surface, and also having an integral spring struck up from the body thereof, and a movable actuated starter coöperative with said resistant starting member.

13. A machine of the class specified embodying a resistant sheet-metal starting member having a beaded working end forming a rounded journal-surface, and also having an integral spring-stop struck up from the body thereof, and a movable actuated starter coöperative with said resistant starting member.

14. The combination with a settable resistant starter and side guiding means therefor in sliding engagement with the resistant starter, of an orbitally-movable starter normally out of engagement with the resistant starter but coöperative therewith when the resistant starter is set.

15. The combination with a support having guide-walls, of a laterally-resilient settable resistant starter located between said walls, and an orbitally-movable starter normally out of engagement with the resistant starter but coöperative therewith when the resistant starter is set.

16. The combination with a support having guide-walls, of a spring; a settable resistant starter side-guided between one of said walls and the spring, and an orbitally-movable starter normally out of engagement with the resistant starter but coöperative therewith when the resistant starter is set.

17. The combination with a support having guide-walls, of a spring; a laterally-resilient settable resistant starter side-guided between one of said walls and the spring; and a movable starter normally out of engagement with the resistant starter but coöperative therewith when the resistant starter is set.

18. In combination with a resistant starter, a movable starter normally out of engagement with the resistant starter but coöperative therewith when the resistant starter is set, one of said members being laterally resilient and having a spring-stop.

19. In a machine of the class specified, the combination of a settable resistant starter and side-guiding means therefor in yielding engagement with each other; starter-setting means; and a two-movement-starter-operated starter-resetting member one of the movements of which is controlled by the resistant starter.

20. In a machine of the class specified, the combination, with a settable resistant starter and side guiding means therefor in yielding engagement with each other, of starter-setting means, and a rotary revoluble starter-operated starter-resetting member the rotary movement of which is controlled by the resistant starter.

21. The combination with a support having guide-walls, of a settable resistant starter; a spring for frictionally holding said settable resistant starter in its different positions; and an orbitally-movable starter coöperative with the resistant starter.

22. A machine of the class specified embodying a sheet-metal resistant starting member having a beaded working end forming a rounded journal-surface, and also having a pair of integral stops at different points in the length thereof, and a movable actuated starter coöperative with said resistant starting member.

23. A machine of the class specified embodying a curved sheet-metal resistant starting member having a beaded working end forming a rounded journal-surface, and also having a pair of integral spring-stops at different points in the length thereof, and a movable actuated starter coöperative with said resistant starting member.

24. A machine of the class specified embodying a curved sheet-metal resistant starting member having a beaded working end forming a rounded journal-surface, and also having a pair of integral stops one adjacent to, and on the same side of the starting member as, the beaded portion, and the other adjacent to the other end of and on the opposite side of the starting member, and a movable actuated starter coöperative with said resistant starting member.

25. A machine of the class specified embodying a bowed starting-latch having at one end thereof a rounded journal-surface, and a movable actuated starter coöperative with said latch.

26. A machine of the class specified embodying a bowed sheet-metal starting-latch having at one end thereof a rounded journal-surface, and also having stops at different points in the length thereof, and a movable actuated starter coöperative with said latch.

27. A machine of the class specified embodying a bowed sheet-metal starting-latch having a beaded working end projecting from the concave face thereof and forming a rounded journal-surface, and also having a pair of stops one projecting from the concave and the other from the convex face thereof, and a movable actuated starter coöperative with said latch.

28. A machine of the class specified embodying a sheet-metal starting-latch bent transversely at one point in the length thereof to form a transverse detent-face, and a movable actuated starter coöperative with said latch.

29. A machine of the class specified embodying a sheet-metal starting-latch having a beaded working end forming a rounded journal-surface, and also bent transversely at one point in the length thereof to form a transverse detent-face, and a movable actuated starter coöperative with said latch.

30. A machine of the class specified embodying a bowed sheet-metal starting-latch having a beaded working end forming a rounded journal-surface, and also having a pair of stops at different points in the length thereof, said latch also being bent at one point in its length to form a transverse detent-face, and a movable actuated starter coöperative with said latch.

31. In a machine of the class specified, the combination, with a support, of a resistant starter and a movable actuated starter coöperative with each other, one of said starters being yieldingly secured to its support, and an impression member controlled by said movable starter.

32. In a machine of the class specified, the combination of a resistant starter and a two-movement-actuated starter coöperative with each other, one of said starters being yieldingly secured to its support, and an impression member controlled by said movable starter.

33. In a machine of the class specified, the combination, with a resistant starter, of a movable support; a movable actuated starter yieldingly secured to its support and coöperative with said resistant starter; and an impression member controlled by said movable starter.

34. In a machine of the class specified, the combination, with a resistant starter, of a movable support; a movable actuated starter yieldingly pivoted to said support and coöperative with said resistant starter; and an impression member controlled by said movable starter.

35. In a machine of the class specified, the combination, with a settable resistant starter, of a movable support; a movable actuated starter yieldingly secured to said support and coöperative with said resistant starter; starter-setting means for shifting the resistant starter; and an impression member controlled by said movable starter.

36. In a machine of the class specified, the combination, with a resistant starter, of a movable support; a movable actuated starter carried by the support and coöperative with said resistant starter; a yielding medium between the support and said movable starter; and an impression member controlled by said movable starter.

37. In a machine of the class specified, the combination, with a resistant starter, of a movable support; a movable actuated starter carried by the support and coöperative with said resistant starter; a spring between the support and said movable starter; and an impression member controlled by said movable starter.

38. In a machine of the class specified, the combination, with a resistant starter, of a movable support; a rigid movable actuated starter carried by the support and coöperative with said resistant starter; a yielding medium between the support and said movable starter; and an impression member controlled by said movable starter.

39. In a machine of the class specified, the combination of a driving-gear; an orbitally-movable driven gear normally out of mesh therewith and movable in the orbit of the driving-gear; a resistant starter and a coöperative rotary actuated starter orbitally movable in unison with the driven gear, one of said starters being yieldingly secured to a support and adapted to oppose a gradually increasing or cumulative resistance to the other as the two come into contact and thereby rotate the driven gear in true timing as it meshes with the driving-gear; gear-coupling means controlled by the rotation of the driven gear; and an impression member controlled by said rotary starter.

40. In a machine of the class specified, the combination of a driving-gear; an orbitally-movable driven gear normally out of mesh therewith and movable in the orbit of the driving-gear; a resistant starter; an orbitally-movable support; a rotary actuated starter coöperative with the resistant starter and yieldingly secured to said support, and orbitally movable in unison with the driven gear and adapted to oppose a gradually increasing or cumulative resistance to the resistant starter as the two come into contact and a gradually decreasing or vanishing resistance as they separate and thereby rotate the driven gear in true timing as it moves into mesh with the driving-gear; gear-coupling means controlled by the rotation of the driven gear and operative for shifting the latter into mesh with the driving-gear; and an impression member controlled by said rotary starter.

41. In a machine of the class specified, the combination, with a resistant starter, of a movable support; a movable actuated starter yieldingly secured to said support and coöperative with said resistant starter; a resetting member coöperative with the movable starter for resetting the resistant starter; and an impression member controlled by said movable starter.

42. In a machine of the class specified, the combination, with a resistant starter, of an orbitally-movable support; an orbitally-movable rotary actuated starter yieldingly secured to said support, and coöperative with said resistant starter; an orbitally-movable resetting member coöperative with the movable starter for resetting the resistant starter; and an impression member controlled by said rotary starter.

43. In a machine of the class specified, the combination, with a resistant starter, of a movable support; a movable actuated combined starter and resetter yieldingly secured to said support and coöperative with said resistant starter; and an impression member controlled by said rotary starter.

44. In a machine of the class specified, the combination, of a resistant actuating member and a movable actuated member coöperative therewith, one of said members being yieldingly secured to its support; and an impression member controlled by said actuated member.

45. In a machine of the class specified, the combination of a resistant actuating member and an orbitally-movable rotary actuated member coöperative therewith, one of said members being yieldingly secured to its support; and an impression member controlled by said actuated member.

46. In a machine of the class specified, the combination of a resistant actuating member and a three-movement-actuated member coöperative therewith, one of said members being yieldingly secured to its support; and an impression member controlled by said actuated member.

47. In a machine of the class specified, the combination of a resistant actuating member yieldingly secured to its support; an orbitally-movable axially-reciprocatory rotary actuated member coöperative therewith; and an impression member controlled by said actuated member.

48. In a machine of the class specified, the combination of a resistant actuating member yieldingly secured to its support; an orbitally-movable axially-reciprocatory rotary actuated member coöperative therewith, one of said members having a cam-shaped working face; and an impression member controlled by said actuated member.

49. In a machine of the class specified, the combination, with a resistant actuating member having a yieldingly-mounted section, of a rotary actuated member coöperative therewith and orbitally movable in the path of said resistant member and its yielding section; and an impression member controlled by said actuated member.

50. In a machine of the class specified, the combination of a resistant actuating member shiftably secured to a support; an orbitally-movable actuated member coöperative therewith; and an impression member controlled by said actuated member.

51. In a machine of the class specified, the combination, with a resistant actuating member having a pivoted section, of a two-movement-actuated member coöperative therewith, and an impression member controlled by said actuated member.

52. In a machine of the class specified, the combination, with a resistant actuating member having a pivoted section limited in its movements by the main portion of the resistant member, of a two-movement-actuated member coöperative therewith, and an impression member controlled by said actuated member.

53. In a machine of the class specified, the combination, with a resistant actuating member having a yieldingly-mounted pivoted section, of a two-movement-actuated member coöperative therewith, and an impression member controlled by said actuated member.

54. The combination, with a resistant actuating member shiftable in a path of predetermined length, of an orbitally-movable rotary actuated member coöperating therewith for exerting force thereupon in one direction for shifting the actuating member, and also for exerting force upon the actuating member in another direction and for being shifted by the resistance of the latter.

55. The combination, with a driving-gear, of a rotary driven gear; means for carrying the driven gear in a path corresponding with that of the driving-gear; a resistant actuating member for inaugurating the rotation thereof; and a rotary actuated member controlled by the rotation of the driven gear and orbitally movable in the path of said resistant member and shiftable relatively to said resistant actuating member at a predetermined point for continuing said rotation.

56. The combination, with a driving-gear, of a rotary driven gear; means for carrying the driven gear in a path corresponding with that of the driving-gear; a resistant actuating member for inaugurating the rotation thereof; and a rotary actuated member controlled by the rotation of the driven gear and orbitally movable in the path of said resistant member, and operative for bodily shifting said driven gear into and out of mesh with the driving-gear at a predetermined point in the path thereof.

57. The combination with a resistant actuating member, of a rotary actuated member orbitally movable in a path of said resistant member and shiftable relatively to the resistant actuating member at a predetermined point for operative engagement therewith, and means for inaugurating the rotation of said actuated member at different points in its orbit and prior to said shifting.

58. The combination, with a resistant actuating member, of a rotary actuated member orbitally movable in a path of said resistant member, and operative for shifting said actuating member when started rotating at one point, and axially shiftable by the resistant actuating member when started rotating at another point; and means for starting the rotation of said actuated member at different predetermined orbital points in its orbit.

59. The combination, with a resistant actuating member, of a rotary actuated member orbitally movable in the path of said resistant member, and operative for exerting a force on said actuating member and shifting said member when the rotation of the driven gear starts at one point, and axially shiftable by the resistant actuating member, and operative for exerting force thereon, in a different direction when the rotation of said driven gear starts at another point; and means for starting the rotation of said actuated member at different predetermined orbital points in its orbit.

60. The combination, with a resistant actuating member, of a rotary actuated member orbitally movable in the path of said resistant member, and operative for exerting force on said actuating member and shifting said member when the rotation of the driven gear starts at one point, and axially shiftable by said member, and operative for exerting force thereon, in a different direction when the rotation of said driven gear starts at another point, and means for starting the rotation of said actuated member at different predetermined orbital points in its orbit.

61. The combination, with a driving-gear, of a rotary driven gear; means for carrying the driven gear in a path corresponding with that of the driving-gear; a resistant actuating member having a shiftable section; a rotary actuated member controlled by the rotation of the driven gear and orbitally movable in the path of said resistant member and its shiftable section and shiftable relatively to the resistant actuating member at a predetermined point, and means for starting the rotation of said actuated member at different points in its orbit.

62. The combination, with a driving internal gear, of a rotatable driven gear normally out of mesh with said internal gear and shiftable into and out of mesh therewith; means for carrying the driven gear in a path corresponding with that of the driving-gear; a resistant actuating member coacting with the driving-gear and having a shiftable section; means for starting the rotation of the driven gear at different points in its orbit; and an actuated member movable in unison with the driven gear and operative for exerting force on said shiftable section and shifting such section when the rotation of the driven gear starts at one point, and shiftable by the resistant actuating member, and operative for exerting force thereon, in a different direction when the rotation of said driven gear starts at another point.

63. The combination, with a driving internal gear, of a rotatable driven gear normally out of mesh with said internal gear and shiftable into and out of mesh therewith; means for carrying the driven gear in a path corresponding with that of the driving-gear; means for starting the rotation of the driven gear at different points in its orbit; and gear-shifting uncoupling means embodying a resistant actuating member coacting with the driving-gear and having a shiftable section, said uncoupling means also embodying an actuated member movable in unison with the driven gear and operative for shifting such section when the rotation of the driven gear starts at one point, and shiftable by such section to uncouple the driven gear when the rotation of the latter starts at another point.

64. The combination, with a driving internal gear, of a rotatable driven gear normally out of mesh with said internal gear and shiftable into and out of mesh therewith; a pair of impression members supported for rotation in unison with the driven gear and disposed in different circumferential positions; means for carrying the driven gear in a path corresponding with that of the driving-gear; means for starting the rotation of the driven gear at different points in its orbit; and shifting uncoupling means embodying a resistant actuating member coacting with the driving-gear and having a shiftable section, said uncoupling means also embodying an actuated member movable in unison with the driven gear and operative for shifting such section when the rotation of the driven gear starts at a point corresponding to the position of one of the impression members, and shiftable by such section to uncouple the driven gear when the rotation of the latter starts at a point corresponding to the position of the other impression member.

65. The combination, with an orbitally-movable rotary impression member, and with means for revolving and rotating the same, of a yielding stop supported for movement in unison with the impression member, and a resistant stop-face coacting with said movable stop.

66. The combination, with an orbitally-movable rotary impression member, and with means for revolving and rotating the same, of a yielding stop supported for movement in unison with the impression member and constructed to oppose a gradually-increasing or cumulative resistance to the resistant stop-face, and a resistant stop-face coacting with said movable stop.

67. The combination, with an orbitally-movable rotary impression member, and with means for revolving and rotating the same, of a yielding stop supported for movement in unison with the impression member and having successively-effective resilient members, and a resistant stop-face coacting with said movable stop.

68. The combination, with a driving internal gear, and with a rotatable driven gear orbitally movable in a path corresponding with that of the driving-gear, of means for carrying the driven gear in its orbit; means for starting the rotation of the driven gear; and gear-coupling means embodying a resistant actuating member and also embodying a yielding actuated member movable in unison with the driven gear and coöperative with said actuating member.

69. The combination, with a driving internal gear, and with a rotatable driven gear orbitally movable in a path corresponding with that of the driving-gear, of means for carrying the driven gear in its orbit; means for starting the rotation of the driven gear; and gear-coupling means embodying a resistant actuating member and also embodying an actuated spring-arm movable in unison with the driven gear and coöperative with said actuating member.

70. The combination, with a driving internal gear, and with a rotatable driven gear orbitally movable in a path corresponding with that of the driving-gear, of means for carrying the driven gear in its orbit; means for starting the rotation of the driven gear; and gear-coupling means embodying a resistant actuating member and also embodying an actuated spring-cam movable in unison with the driven gear and coöperative with said actuating member.

71. In a machine of the class specified, the combination, with a rotary member, of an impression member carried thereby; means for intermittently rotating said member; and a detent movable longitudinally of the axis of said member and operative for stopping the rotation thereof.

72. In a machine of the class specified, the combination, with an orbitally-movable rotary member, of an impression member carried thereby; means for carrying said member in its orbit; means for intermittently rotating said member; and a detent movable longitudinally of the axis of said member and operative for stopping the rotation thereof.

73. In a machine of the class specified, the combination, with a rotary member having a circumferential cam-face, of means for intermittently rotating said member, and a detent movable longitudinally of the axis of said member for stopping the rotation thereof and also shiftable by said cam-face.

74. In a machine of the class specified, the combination, with a rotary member having circumferential and lateral cam-faces, of means for intermittently rotating said member, and a detent shiftable longitudinally and transversely of the axis of said member by said cam-faces and operative for stopping the rotation of said member.

75. In a machine of the class specified, the combination, a rotary member, and with means for intermittently rotating the same, of a detent reciprocatory longitudinally of the axis of said member and also in a path transverse thereto and operative for stopping the rotation of said member.

76. In a machine of the class specified, the combination, with a rotary member having circumferential and lateral cam-faces, of means for intermittently rotating said member, and an oscillatory detent having an independent reciprocatory movement longitudinally of the axis of said member and controlled in its movements by said cam-faces and operative for stopping the rotation of said member.

77. In a machine of the class specified, the combination, with a rotary member having circumferential and lateral cam-faces, of means for intermittently rotating said member; an oscillatory frame controlled in its movements by one of said cam-faces; and a reciprocatory spring-pressed detent carried by said frame and controlled in its movements by the other of said cam-faces and operative for stopping the rotation of said rotary member.

78. The combination, with a resistant driving-gear, and with a rotary driven gear orbitally movable in a path corresponding with that of the driving-gear, of means for carrying the driven gear in its orbit; means for starting the rotation of the driven gear; gear-coupling means for carrying the driven gear into mesh with the driving-gear; gear-uncoupling means; a rotary member supported for movement in unison with the driven gear and having circumferential and lateral cam-faces; and a detent shiftable longitudinally and transversely of the axis of said driven gear by said cam-faces and operative for stopping the rotation of said gear on the uncoupling of the latter from the driving-gear.

79. The combination, with a resistant driving-gear, of a rotary gear orbitally movable in a path corresponding with that of the driving-gear and shiftable longitudinally of its axis of rotation; means for carrying the driven gear in its orbit; means for starting the rotation of the driven gear; gear-coupling means for carrying the driven gear into mesh with the driving-gear; gear-uncoupling means; and a rotary carrier supporting the driven gear and on which the latter is shiftable, said carrier and the driven gear having complementary male and female members forming a dash-pot.

80. The combination, with a resistant driving-gear, of a pair of rotary members orbitally movable in a path corresponding with that of the driving-gear and one mounted eccentrically to the other; a rotary driven gear carried by one of said members; connecting means between said rotary members; means for carrying said rotary members in their orbit; and means for starting the rotation of the driven gear.

81. The combination, with a resistant driving-gear, of a pair of rotary members orbitally movable in a path corresponding with that of the driving-gear and one mounted eccentrically to the other; a rotary driven gear carried by one of said members; a universal connection between said rotary members for rotating them in unison; means for carrying said rotary members in their orbit; and means for starting the rotation of the driven gear.

82. The combination, with a resistant driving-gear, of a pair of rotary members orbitally movable in a path corresponding with that of the driven gear and one mounted eccentrically to the other; a rotary driven gear carried by one of said members and shiftable longitudinally thereof; connecting means between said rotary members; means for carrying said rotary members in their orbit; means for starting the rotation of the driven gear; and gear-coupling means for shifting said driven gear into mesh with the driving-gear.

83. The combination, with a resistant driving-gear, of an orbitally-movable rotary carrier; a driven gear mounted eccentrically on said carrier and orbitally movable in a path corresponding with that of the driving-gear and shiftable longitudinally of said carrier; means for carrying the driven gear in its orbit; means for starting the rotation of the driven gear; a universal connection between the carrier and the driven gear; and gear-coupling means for shifting said driven gear longitudinally of the carrier and into mesh with the driving-gear.

84. The combination, with a resistant driving-gear, of an orbitally-movable rotary carrier; a driven gear mounted eccentrically on said carrier and orbitally movable in a path corresponding with that of the driving-gear and shiftable longitudinally of said carrier; means for carrying the driven gear in its orbit; means for starting the rotation of the driven gear; a universal connection between the carrier and the driven gear; and gear-coupling means for shifting said driven gear longitudinally of the carrier and into mesh with the driving-gear and embodying a coupling member movable in unison with the driven gear.

85. The combination, with a resistant driving-gear, of an orbitally-movable rotary carrier; a driven gear mounted eccentrically on said carrier and orbitally movable in a path corresponding with that of the driving-gear and shiftable longitudinally of said carrier; means for carrying the driven gear in its orbit; means for starting the rotation of the driven gear; a universal connection between the carrier and the driven gear; gear-coupling means for shifting said driven gear longitudinally of the carrier and into mesh with the driving-gear and embodying a coupling member movable in unison with the driven gear; and gear-uncoupling means for shifting said driven gear longitudinally of the carrier and out of mesh with the driving-gear and embodying an uncoupling member also movable in unison with the driven gear.

86. The combination with a fixed cam, of a shiftable member, and a movable cam coöperative with the said fixed cam for shifting said shiftable member, one of said cams having a yieldably-hinged contact-face.

87. The combination with a fixed cam, of a rotatable axially-shiftable member, and a movable cam coöperative with the said fixed cam for shifting said shiftable member axially, one of said cams having a yieldably-hinged contact-face.

88. The combination with a fixed cam, of a rotatable axially-shiftable member, a rotatable cam having an orbital movement to cause it to coöperate with said fixed cam and thereby shift said shiftable member axially, and means brought into action upon the shifting of said shiftable member axially in one direction for causing the continued rotation of said shiftable member, one of said cams having a yieldably-hinged contact-face.

89. The combination with a fixed cam, of a rotatable axially-shiftable member, a rotatable cam having an orbital movement to cause it to coöperate with said fixed cam and thereby shift said shiftable member axially, means brought into action upon the shifting of said shiftable member axially in one direction for causing the continued rotation of said shiftable member, an impression-device carrier moving in unison with the rotary movement of said shiftable member and selective mechanism for initiating the rotation of said member at predetermined points, one of said cams having a yieldably-hinged contact-face.

90. The combination with a fixed cam, of a rotatable axially-shiftable member, a rotary cam provided with a yieldably-hinged contact-face and having an orbital movement to cause it to coöperate with the said fixed cam and thereby shift said shiftable member axially, means for continuing the rotary movement of said shiftable member when shifted axially in one direction, an impression-device carrier moving in unison with the rotary movement of said shiftable member and selective mechanism for initiating the rotation of said shiftable member at predetermined points.

91. The combination with a fixed cam, of a rotatable axially-shiftable member, a rotary cam provided with a yieldably-hinged contact-face and having an orbital movement to cause it to coöperate with the said fixed cam and thereby shift said shiftable member axially, means for continuing the rotary movement of said shiftable member when shifted axially in one direction, an impression-device carrier moving in unison with the rotary movement of said shiftable member, and selective mechanism for initiating the rotary movement of said shiftable member and said impression-device carrier, said cam having a yielding contact-face.

92. The combination of a rotary carrier, impression-device carriers mounted thereon and rotatable about respective axes situated at different distances from the axis of rotation of the carrier, and selective mechanism.

93. The combination of a rotary carrier, impression-device carriers mounted thereon and rotatable about respective axes situated at different distances from the axis of rotation of the carrier, selective mechanism, a driving-gear, a driven gear for rotating each impression-device carrier and which is shiftable upon the selection of the impression-device carrier in unison with which it moves into engagement with the driving-gear, and means for automatically disengaging such driving and driven gears at predetermined points in the rotary movement of the said rotary carrier.

94. The combination of a detent and a settable latch in sliding engagement with each other, said latch having a recess portion in which said detent by its resilience may enter.

95. The combination of a settable latch, a resilient detent adapted to engage with a recess in the latch, and means for shifting the latch in opposition to the friction of the detent.

96. The combination of a settable latch, a resilient detent, and a stop for holding the latch in its set position.

97. The combination with a resistant starter of a movable actuatable starter having a yieldable starter.

98. The combination with a settable resistant starter and laterally-resilient side guides therefor, of a revoluble-actuated starter coöperative therewith.

99. The combination with a pivotally-supported resistant actuating member having a predetermined arc of movement, of an actuated starter operative therewith.

FRANCIS H. RICHARDS.

Witnesses:
FRED J. DOLE,
CHAS. FINKLER.